(12) United States Patent
Ono et al.

(10) Patent No.: US 8,526,015 B2
(45) Date of Patent: Sep. 3, 2013

(54) CONTROL METHOD FOR A PRINTER AND A PRINTER

(75) Inventors: Masakazu Ono, Azumino (JP); Tomoyuki Oi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 546 days.

(21) Appl. No.: 12/381,504

(22) Filed: Mar. 12, 2009

(65) Prior Publication Data

US 2009/0231131 A1 Sep. 17, 2009

(30) Foreign Application Priority Data

Mar. 13, 2008 (JP) ................................. 2008-063735

(51) Int. Cl.
*G06F 3/12* (2006.01)

(52) U.S. Cl.
USPC ............. 358/1.1; 340/692; 347/23; 358/1.13; 358/1.15

(58) Field of Classification Search
USPC .......... 358/1.1, 1.13, 1.15; 235/383; 271/38, 271/117; 340/692, 691.8; 347/23; 399/81, 399/407
See application file for complete search history.

(56) References Cited

U.S. PATENT DOCUMENTS

| | | | | |
|---|---|---|---|---|
| 6,612,759 | B2 * | 9/2003 | Fukano et al. | 400/74 |
| 7,061,635 | B1 * | 6/2006 | Wanda et al. | 358/1.15 |
| 7,819,056 | B2 * | 10/2010 | Iwamoto | 101/119 |
| 7,933,032 | B2 * | 4/2011 | Funahashi | 358/1.14 |
| 2001/0004241 | A1 * | 6/2001 | Fukano et al. | 340/692 |
| 2001/0039893 | A1 * | 11/2001 | Kawakami et al. | 101/288 |
| 2004/0184067 | A1 * | 9/2004 | Suzuki | 358/1.15 |
| 2006/0018696 | A1 * | 1/2006 | Mori et al. | 399/407 |
| 2007/0019226 | A1 * | 1/2007 | Matsuura et al. | 358/1.14 |
| 2008/0106755 | A1 * | 5/2008 | Morooka | 358/1.15 |
| 2009/0231131 | A1 * | 9/2009 | Ono et al. | 340/540 |

FOREIGN PATENT DOCUMENTS

| | | |
|---|---|---|
| JP | 7-101109 A | 4/1995 |
| JP | 7156461 A | 6/1995 |
| JP | 8-77462 | 3/1996 |
| JP | 2000-141839 | 5/2000 |
| JP | 2000-244682 A | 9/2000 |
| JP | 2001-166904 | 6/2001 |
| JP | 2002-331712 | 11/2002 |
| JP | 2003288179 A | 10/2003 |
| JP | 2004-037489 | 2/2004 |
| JP | 2004-164484 | 6/2004 |
| JP | 2006088503 A | 4/2006 |

OTHER PUBLICATIONS

European Search Report, EP Application No. 09 003313.5, dated Jul. 9, 2010.

* cited by examiner

*Primary Examiner* — King Poon
*Assistant Examiner* — David S Cammack
(74) *Attorney, Agent, or Firm* — Nutter McClennen & Fish LLP; John J. Penny, Jr.; Michael P. Visconti, III

(57) ABSTRACT

Sounding a buzzer a plurality of times can be controlled with few commands, the processor load is reduced when sounding the buzzer, and the buzzer can be sounded at the desired timing. A printer 1 having a buzzer 40 receives print data containing four types of data, a print configuration command A, a buzzer configuration command B, a printing control command C, and a stop printing command D, from a host device 2. The buzzer configuration command B is a command that sets the conditions and method of sounding the buzzer 40. The buzzer configuration command B sets the new page command C2 as the command that triggers sounding the buzzer 40 from among commands and data contained in the printing control command. When the control unit 10 of the printer 1 detects the new page command C2 while executing a print job, the control unit 10 causes the buzzer 40 to sound at the specified timing in the new page process.

9 Claims, 2 Drawing Sheets

CONTROL METHOD FOR A PRINTER AND A PRINTER

Control method for a printer and a printer This application claims priority under 35 U.S.C. §119 to Japanese Patent Application No. 2008-063735 filed on Mar. 13, 2008, the entire disclosure of which is expressly incorporated by reference herein.

BACKGROUND OF THE INVENTION

1. Field of Invention

The present invention relates to a printer that is equipped with a buzzer and can sound the buzzer at a predetermined time linked to a printing-related operation that is triggered by sending commands and data from a host device, and further relates to a control method for a printer that is equipped with a buzzer.

2. Description of Related Art

Printers that equipped with a buzzer include printers that sound the buzzer when a command is sent from a host device, and printers that are preset to sound the buzzer according to the condition of the printer.

The latter type of printer with a buzzer is taught in Japanese Unexamined Patent Appl. Pub. JP-A-2001-166904. This printer is configured to sound the buzzer under predetermined conditions, such as if a cover is opened during operation, if printing stops because there is no paper, or if a recoverable error or a non-recoverable error occurs. In addition to printer commands and line feed commands received from the host device, the printer also receives an audible report configuration command that controls whether to sound the buzzer as well as the type of buzzer sound and how many times the buzzer sounds. If a buzzer off command is received from the host, the printer can execute an interrupt process based on the buzzer off command to stop the buzzer.

While JP-A-2001-166904 teaches a printer that can sound the buzzer when triggered by detecting an error state, it is silent about sounding the buzzer triggered by executing specific control commands while printing a print job so that the buzzer sounds at each page end or paper cutting operation, for example. In addition, because the conditions for sounding the buzzer are preset in the printer itself, there is no need to send a buzzer command from the host in order to always sound the buzzer under the same conditions, but the audible report configuration command must be sent from the host every time the trigger condition changes in order to change the printer-side setting. Therefore, if the setting for sounding the buzzer is complicated, such as sounding the buzzer at every n-th page end operation, the audible report configuration command must be resent each time the buzzer is sounded, and processing becomes complex.

It may also be desirable to notify the user of conditions other than when a printer problem occurs, such as when a specific print job is completed. More specifically, the buzzer is sounded to inform the user when a specific command related to printing a job is executed, such as when printing is completed, at a page end, or when the paper is cut. It is desirable in such situations to be able to easily set or change whether or not the buzzer is sounded, and one way of doing this is to add a buzzer command at the timing for sounding the buzzer to a print command that is sent from the host. As an example of this print command sent from the host to the printer, the buzzer command may be added to the stop printing command denoting the end of printing after the print data, or the buzzer command may be added to the end of page command that denotes the end of page position in the print data.

However, methods of inserting a buzzer command in the data stream containing print commands from the host device at the locations (in the sequence) where the buzzer should be sounded have the following problems.

First, because the printer interprets the buzzer commands contained in the print command to sound the buzzer each time (in the order) the buzzer is to be sounded, there is a delay to the timing at which the buzzer should actually sound.

Furthermore, because a buzzer command is required each time the buzzer sounds, the structure of the print command and printer-side processing become complicated.

In addition, if the buzzer command is received after printing ends, for example, the printer must detect the stop printing command, execute the stop printing process operation, and then execute the buzzer command to sound the buzzer. The stop printing process operation may be a process that returns the head carriage to the home position, advance the paper, cut the paper, or runs the head cleaning process when specific conditions are met. Because sounding the buzzer waits until the head cleaning process ends once the head cleaning process starts, the timing at which the buzzer sounds to notify the user that printing ended is significantly delayed from the actual end of printing.

SUMMARY OF THE INVENTION

A printer and a control method for a printer that is equipped with a buzzer can sound the buzzer without a delay from a predetermined timing, and can sound the buzzer at different times based on a single buzzer configuration command.

A first aspect of the invention is a control method for a printer equipped with a buzzer, including steps of receiving a printing control command for printing specific content on the printer, and a buzzer configuration command for configuring buzzer sounding; and causing the buzzer to sound at a predetermined timing and method when triggered by a predetermined command when the predetermined command specified by the buzzer configuration command is contained in the printing control command.

Another aspect of the invention is a control method for a printer including steps of storing a setting including first data or a first command for the printer to sound the buzzer based on a buzzer configuration command; and the printer sounding the buzzer based on the first data or first command.

The invention can thus cause a buzzer to sound based on first data or a first command when triggered by a predetermined command (trigger command) contained in the printing control command based on the buzzer configuration command. Therefore, as long as the setting from the buzzer configuration command remains stored, the buzzer can be sounded each time the trigger command is executed or as many times as the first data or first command is detected after setting the buzzer configuration with a single command, and the data structure of the print command can be simplified. Furthermore, because it is not necessary to interpret the command for sounding the buzzer before the command is executed, processing time is minimal. The time lag until the buzzer sounds can therefore be eliminated or shortened. The command or data used as the trigger for sounding the buzzer, and how the buzzer sounds can also be changed freely.

The printing control command may contain commands as well as data for printing.

The timing when the buzzer sounds can be triggered by receiving or executing a predetermined command (trigger command) or first command when triggered by receiving or printing the first data.

In another aspect of the invention the first data or first command is related to issuing a printout from the printer.

The first command is a command related to output from the printer, such as a stop printing command, new page command, or paper cutting command, and the buzzer can be sounded when the command is executed to notify the user when the printout was issued. When the printout is a sales receipt, the first data may be set to text that is printed toward the end of a receipt, such as an underscore character or specific text such as TOTAL or END, thus enabling notifying the user when the printout is completed.

In another aspect of the invention the setting including the first data or the first command causing the printer to sound the buzzer is stored as a default setting in the printer. If a command related to issuing a printout, or TOTAL or other predetermined text that is printed at the end of the printout, is predefined and set and stored as the default value, it is also not necessary to send a buzzer configuration command.

The printer control method according to another aspect of the invention further includes a step of cancelling (clearing or resetting the default setting) the setting based on the printer receiving second data or a second command. For example, when a daily sales report is printed at the end of each day in a retail store, the setting may be cleared when a command related to the printing format, such as the number of columns, or data such as the date that is printed at the beginning of the report is received so that the buzzer does not sound needlessly. Alternatively, the setting may be reset to the default.

In the printer control method according to another aspect of the invention the buzzer is sounded at a predetermined timing referenced to when the first data or first command is received. If it is desirable to inform the user as soon as possible, the buzzer can be configured to sound as soon as the first data or first command is received. If notification when a process actually executes is desirable, the buzzer may be sounded when the first data is printed after the data is received, or when the first command is executed after the command is received. Considering work done by the user, the buzzer may further alternatively be sounded when a set amount of time has passed after the data is printed or the command is executed. This enables sounding the buzzer when a predetermined time has passed after a receipt is issued so that the buzzer functions as an alarm to help prevent the user from forgetting to take the receipt.

A control method for a printer according to another aspect of the invention includes steps of receiving a print command stream including a command set positioning the buzzer configuration command and the printing control command; determining if the buzzer configuration command is contained in the command set received before the printing control command, and storing a setting including the predetermined command specified by the buzzer configuration command if the buzzer configuration command is included; and sounding the buzzer based on the setting of the buzzer configuration command by the predetermined command if the predetermined command contained in the print command is detected.

Because the buzzer configuration command is positioned before the printing control command in this aspect of the invention, it can be determined if the buzzer configuration command is contained, and the specific command (trigger command) specified by the buzzer configuration command can be stored before interpreting the printing control command and executing the printing process. The buzzer can therefore be reliably sounded triggered by executing a predetermined command in the printing process.

In a printer control method according to another aspect of the invention the print command includes a new page command specifying a new page process, and/or a stop printing command specifying a process that is executed after the printing process ends; and the new page command and/or stop printing command is set as the predetermined command in the buzzer configuration command.

Further preferably, the print command contains a plurality of new page commands; and only a portion of the new page commands contained in the plurality of new page commands is set as the predetermined command in the buzzer configuration command.

This aspect of the invention enables sounding the buzzer timed to a new page or timed to the completion of printing. In addition, when the buzzer is sounded timed to a new page, the buzzer can be sounded at only selected pages, such as every n-th page or the end of the last page, instead of at every new page.

The control method for a printer according to another aspect of the invention further includes a step of specifying by means of the buzzer configuration command at least one of a group of parameters including a buzzer sounding pattern, buzzer volume, and buzzer frequency. This enables sounding the buzzer in different ways.

Another aspect of the invention is a printer including a buzzer; a communication unit that receives data and commands sent from a host device; a storage unit that stores first data or a first command for sounding the buzzer based on the buzzer configuration command received by the communication unit; and a control unit that sounds the buzzer based on the first data or first command received by the communication unit.

This aspect of the invention can thus cause a buzzer to sound based on first data or a first command when triggered by executing a predetermined command (trigger command) contained in the printing control command based on the buzzer configuration command. Therefore, as long as the setting from the buzzer configuration command remains stored, the buzzer can be sounded each time the trigger command is executed or as many times as the first data or first command is detected after setting the buzzer configuration with a single command, and the data structure of the print command can be simplified. Furthermore, because it is not necessary to interpret the command for sounding the buzzer before the command is executed, processing time is minimal. The time lag until the buzzer sounds can therefore be eliminated or shortened. The command or data used as the trigger for sounding the buzzer, and how the buzzer sounds can also be changed freely.

Other objects and attainments together with a fuller understanding of the invention will become apparent and appreciated by referring to the following description and claims taken in conjunction with the accompanying drawings.

DESCRIPTION OF PREFERRED EMBODIMENTS

A preferred embodiment of the present invention is described below with reference to the accompanying figures.

General Configuration

Figure 1:
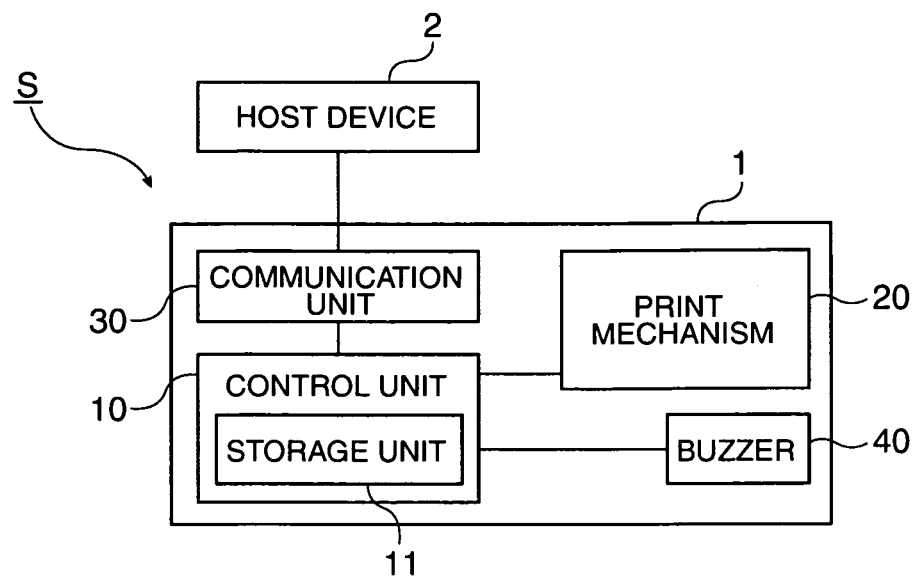
FIG. 1 is a block diagram of a printer according to at least one embodiment of the present invention.

FIG. 1 is a block diagram showing the general configuration of a printer system S including a host device 2 and a buzzer-equipped inkjet printer 1 according to at least one embodiment of the present invention. As shown in FIG. 1, the printer 1 includes a control unit 10 that controls various parts of the printer, a print mechanism 20 that prints on recording paper according to control signals from the control unit 10, a communication unit 30 that is an interface for communicating with the host device 2, and a buzzer 40 that sounds according to a control signal from the control unit 10. The printer 1 also has a power supply unit and operating unit not shown.

The control unit 10 has a CPU or processing unit, and a storage unit 11. The storage unit 11 includes flash ROM or EEPROM that stores programs and data required for configuration and control according to the buzzer configuration command, and RAM that functions as working memory for processes run by the CPU.

Commands and print data from the host device 2 are input through the communication unit 30 to the control unit 10. The communication unit 30 of the printer 1 is connected to the host device 2 for wireless communication through a wireless LAN adapter, for example, or for wired communication through a cable such as a USB cable or LAN cable.

The print mechanism 20 includes a recording head, a carriage that carries the recording head, a carriage transportation mechanism that moves the carriage across the width of the paper, a paper cutting mechanism that cuts the recording paper, and drive mechanisms for these other mechanisms. The print mechanism 20 also has a paper transportation mechanism for conveying roll paper or other recording paper loaded in the printer 1 through a predetermined transportation path. The print mechanism 20 also has a gate array or other type of drive circuit and a drive motor, and generates and supplies a motor drive current to the drive motor when a control signal from the control unit 10 is input to the drive circuit.

Output from the drive motor is conveyed to a drive mechanism for the paper transportation mechanism or recording head drive mechanism, causing the appropriate mechanism to operate. The control unit 10 causes the paper transportation mechanism to operate and convey the recording paper in conjunction with the printing operation when the recording head operates. When the printing operation of the recording head is completed, the control unit 10 executes a paper transportation operation to discharge the printed recording paper from the printer 1.

A piezoelectric buzzer, for example, is used as the buzzer 40. The control unit 10 sends a control signal with a predetermined drive pattern at a predetermined time to the buzzer 40. The buzzer 40 then sounds at the predetermined time and predetermined pattern (including how long the buzzer sounds, the number of times the buzzer sounds, and the sounding interval) according to the drive signal from the control unit 10. The buzzer 40 can also adjust the buzzer volume, frequency, sound quality (the type of sound produced), or other parameters according to the drive signal from the control unit 10. Based on execution of a trigger command that is set by the buzzer configuration command described below, the control unit 10 sends a control signal to the buzzer 40 to cause the buzzer 40 to sound according to the timing and configuration (such as the sounding pattern, volume, and frequency) set by the buzzer configuration command. These parameters can be stored as default values in the storage unit 11 together with the command or data used as the trigger.

Controlling Printing by the Printer

Figure 2:
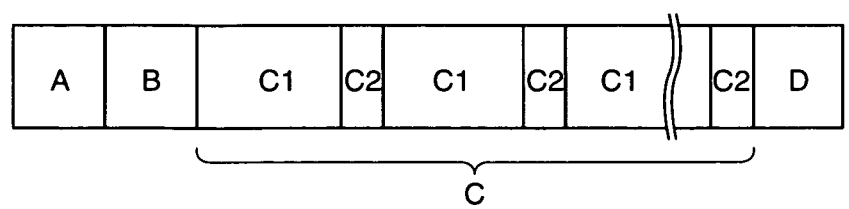
FIG. 2 describes the data format of a print command in the printer shown in FIG. 1.
Figure 3:
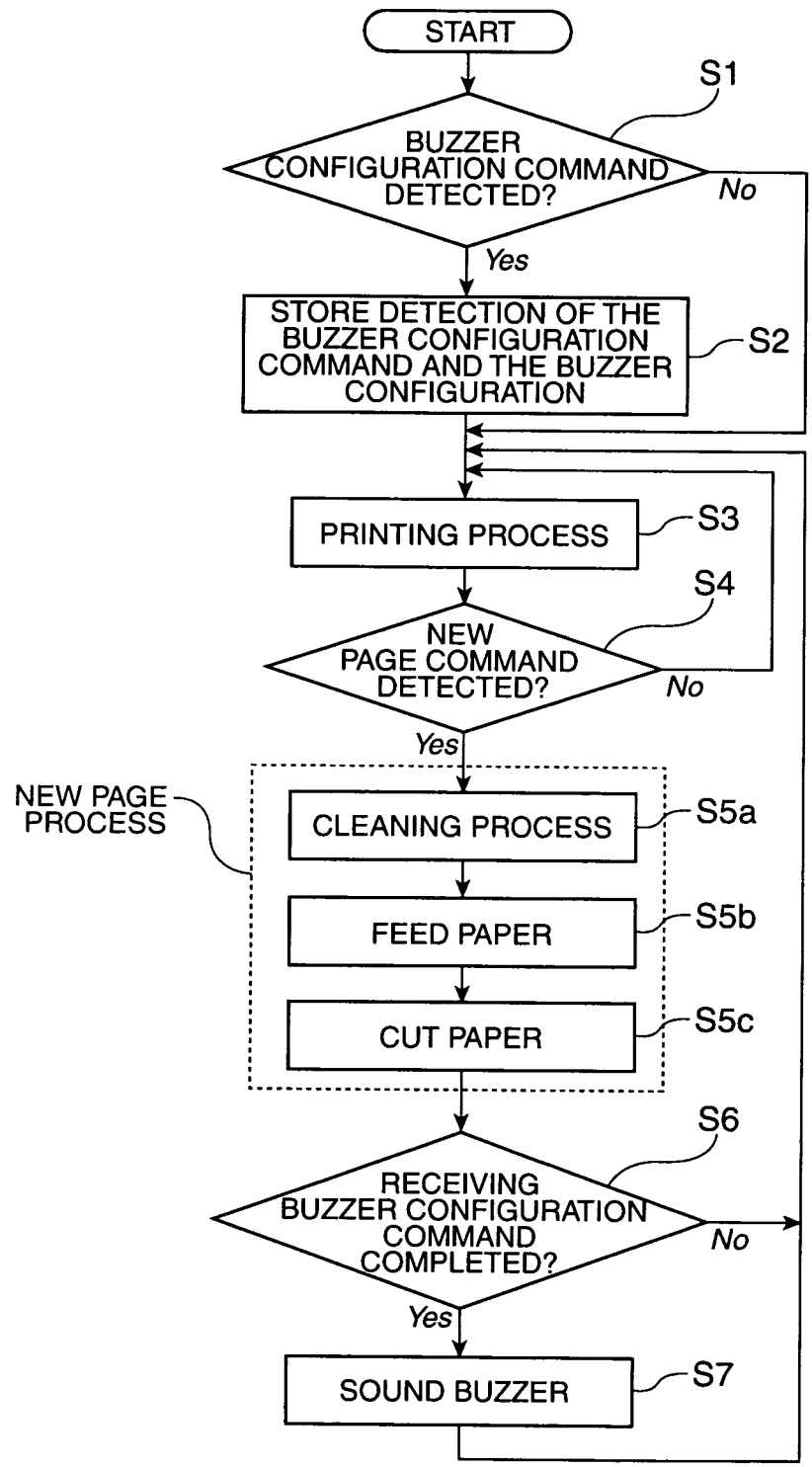
FIG. 3 is a flow chart describing execution of a print job in the printer shown in FIG. 1.

Control of the printer 1 described above when the printer 1 executes a print job is described next. FIG. 2 describes the data format of the print command sent from the host device 2. FIG. 3 is a flow chart of operation when a print job is executed. As shown in FIG. 2, print commands are sent from the host device 2 to the printer 1 using a data format including four types of data arranged in a predetermined sequence that starts with a print configuration command A followed by a buzzer configuration command B, a printing control command C, and then a stop printing command D. The content of these commands is described next.

(1) Print Configuration Command A

The print configuration command A includes a paper set-up command, a paper cutter control command, a platen protection command, and a printing direction configuration command.

The paper set-up command configures, for example, the type of paper, the printing area, and the printing method used for the print job.

The paper cutter control command controls whether or not the automatic paper cutting process executes. The automatic paper cutting process causes the paper cutting device to automatically cut the recording paper after printing each page is completed or after printing a predetermined page, such as the last page, is completed.

The platen protection command controls whether or not a platen protection process is executed to prevent striking the platen as a result of printing when there is no paper loaded.

The printing direction configuration command sets whether to print bidirectionally or in only one direction when a carriage carrying a serial print head moves.

When the print configuration command A is received, the buzzer configuration that is set and stored in the storage unit 11 can be deleted. The buzzer 40 can also be stopped from sounding when printing in a different format, for example. The buzzer configuration can also be restored to the default setting.

(2) Buzzer Configuration Command B

The buzzer configuration command B is a command that sets the conditions for sounding the buzzer 40 and the sounding method. The buzzer configuration command B includes a command for specifying what command contained in the printing control command described below is used as the trigger command for sounding the buzzer 40. The buzzer configuration command B may also contain a command for setting the timing or how the buzzer 40 sounds based on execution of the trigger command. For example, commands setting the sounding pattern, including how long and how many times the buzzer sounds and the sounding interval, and the frequency, sound quality (type of sound), and volume of the buzzer output can be contained in the buzzer configuration command B.

(3) Printing Control Command C

The printing control command C includes the print data C1 and a new page command C2. The print data C1 describes the print content, such as the text and graphics, that is actually printed on the recording paper. The new page command C2 controls the new page process that executes after printing each page. The printing control command C is thus a data stream that alternately contains print data C1 and a new page command C2 for each page to be printed.

The new page command C2 may also contain a cleaning command for automatically cleaning the nozzles of the recording head when the page changes, a paper feed command for advancing the recording paper an amount equal to the footer margin at the end of the page, or a cut command for cutting the paper at the trailing end. Executing the cut command can be controlled by the paper cutter control command contained in the print configuration command A described above. For example, by setting the pages where the cut command is executed or not executed with the paper cutter control command, execution of the cut command can be limited to only the specified pages.

The print data C1 may also contain commands controlling the style of the text and graphics.

(4) Stop Printing Command D

The stop printing command D is a command for executing a process to end a print job after printing to the recording paper has been completed. The stop printing command D includes a command for initializing the content set by the print configuration command A, a command for initializing the content set by the buzzer configuration command B, and a job termination command for reporting the end of the print job to other parts of the printer 1 and to the host device 2, for example.

When the control unit 10 of the printer 1 receives a print command containing the commands described above and the print data from the host device 2, the control unit 10 interprets the commands and print data contained in the print command. The control unit 10 also determines if the buzzer configuration command B is contained in a particular data block in the print command (S1). Because the buzzer configuration command B is contained in the data block immediately before the printing control command C in this embodiment of the invention, the control unit 10 interprets this data block to determine if the buzzer configuration command B is present.

If the buzzer configuration command B is contained in the print command, the control unit 10 records that the buzzer configuration command B was received in the storage unit 11 (S2). In this step the control unit 10 stores the conditions for sounding the buzzer 40 that are set by the buzzer configuration command B, that is, which command is the trigger command and the timing and how the buzzer 40 sounds when the trigger command is detected, in the storage unit 11. The trigger may be print data. In this embodiment of the invention the buzzer configuration command B sets the new page command C2 as the trigger command. The timing for sounding the buzzer 40 is set to the end of the automatic paper cutting process that is executed as part of the new page process for each page. The buzzer format is set to produce a sound of a predetermined volume and frequency once for a predetermined length of time. The control unit 10 stores these buzzer sounding conditions in the storage unit 11.

If the buzzer configuration command B is not detected in step S1, the control unit 10 proceeds to step S3 without storing receipt of the buzzer configuration command B in the storage unit 11.

Although not shown in FIG. 3, the control unit 10 can store the settings from the print configuration command A in the storage unit 11 in the same way as storing the settings from the buzzer configuration command B by interpreting the print configuration command A before executing the printing step. The control unit 10 controls printing as described below according to the settings specified by the print configuration command A and buzzer configuration command B.

The control unit 10 sequentially interprets the printing control command C containing the print data C1 and new page command C2 in alternating order for each page to be printed, and sequentially executes processes according to the interpreted content.

The control unit 10 therefore first interprets the print data C1 for the first page and stores the print data converted for the recording head in an image buffer. Based on the converted print data, the control unit 10 sequentially applies control signals to the head control circuit and paper feed motor control circuit to print (S3). While sequentially interpreting the print data C1 for the first page, the control unit 10 determines if the new page command C2 is detected at the predetermined timing (S4). If the new page command C2 is detected (S4 returns Yes), control goes to executing the new page process (S5a to S5c). If the new page command C2 is not detected (S4 returns No), control returns to step S3 and interpreting and printing the print data C1 continue.

The new page process sequentially executes the following three processes in the following order: the cleaning process (S5a) based on the cleaning command, the paper feed process (S5b) based on the paper feed command, and the automatic paper cutting process (S5c) based on the paper cutting command. If control goes to the new page process, the control unit 10 confirms the result of detecting the buzzer configuration command B in step S1 at the completion of the automatic paper cutting process, which is set as the timing for sounding the buzzer 40 in this print job (S6). If the paper cutter control command indicates that the automatic paper cutting process (S5c) does not execute, the control unit 10 changes the new page process to execute step S6 when the paper feed process (S5b) that is executed before the paper cutting process (S5c) is completed.

If the control unit 10 has stored that the buzzer configuration command B was detected in the storage unit 11 (S6 returns Yes), it sounds the buzzer 40 as specified by the buzzer configuration command B. More specifically, the control unit 10 generates and applies to the buzzer 40 a control signal for driving the buzzer 40 as specified by the buzzer configuration command B, and thus causes the buzzer 40 to sound (S7).

If it is not stored in the storage unit 11 that the buzzer configuration command B was detected (S6 returns No), the control unit 10 returns to step S3 without sounding the buzzer 40 and continues processing.

The control unit 10 thus repeats the printing operation and new page operation for the specified number of pages to be printed, confirms whether or not the buzzer configuration command B was detected at the completion of the paper cutting process in the new page process executed each page (S6), and causes the buzzer 40 to sound if the buzzer configuration command B is detected (S7). After the new page operation for the last page is executed, the control unit 10 runs a process to reinitialize the content set by the print configuration command A and the buzzer configuration command B based on the stop printing command D. More specifically, the parameters set in the storage unit 11 are restored to the default state. Alternatively, the settings may be cleared. Completion of the print job is then reported to the appropriate parts of the printer 1 to set those parts of the printer 1 to the printing standby state, and a signal notifying the host device 2 of the end of the print job is output.

If print data for the next print job has already been received, the next print job is executed without going to the standby state.

Note that the timing for sounding the buzzer 40 may be based on any of steps (S5*a*), (S5*b*), and (S5*c*).

EFFECT OF THE INVENTION

As described above, the printer 1 can cause the buzzer 40 to sound based on the buzzer configuration command B when triggered by the new page command C2 contained in the print command. More specifically, by inserting the buzzer configuration command B before the printing control command C, the buzzer 40 can be caused to sound using all of the new page commands C2 contained in the print command as a trigger command. It is therefore not necessary to insert a buzzer sounding command in the print command at each page break, and the data structure of the print command can be simplified. Furthermore, because it is not necessary to interpret the buzzer sounding command in each new page process, the processor cost of sounding the buzzer can be reduced. The time lag between when the buzzer 40 is to be sounded (when the trigger command is detected) and when the buzzer actually sounds can therefore be eliminated or shortened. The command used as the trigger for sounding the buzzer and how the buzzer sounds (the sounding configuration) can also be changed freely for each print job.

Other Embodiments (1) The new page command C2 for every page is set as the trigger command for sounding the buzzer 40 in the embodiment described above, but the trigger command may be set to only the new page command C2 for a predetermined number of pages. For example, the buzzer could be configured to sound using only the new page command C2 for every n-th page (where n is a natural number) as the trigger command. In this case, each time the new page command C2 is detected the control unit 10 determines how many times the new page command C2 has been detected and determines if the command detection count is a multiple of n. The control unit 10 then executes the step (S6) confirming the presence of the buzzer configuration command B only if the detection count is a multiple of n. This enables sounding the buzzer 40 every n pages.

Further alternatively, in order to sound the buzzer 40 only after printing the last page is completed, steps S6 and S7 can be executed only when the detection count of the new page command C2 indicates the last page. Alternatively, the control unit 10 could proceed to steps S6 and S7 when the stop printing command is detected.

(2) The new page command C2 is set as the trigger command in the embodiment described above, but the stop printing command D may be set as the trigger command. Further alternatively, both the new page command C2 and the stop printing command D may be set as trigger commands.

(3) An alarm means other than the buzzer 40 can also be operated using the same commands used to sound the buzzer 40 described above. For example, an indicator configuration command that sets the conditions for causing an indicator disposed to the printer 1 to illuminate and how the indicator illuminates, or a display output command that sets the conditions for causing a display unit disposed to the printer 1 to display specific content and how the content is display, may be included in the print command in the same way as the buzzer configuration command B described above.

(4) The buzzer configuration command B is contained in the data block immediately before the printing control command C in the print command, but is not limited to this position and only needs to precede the printing control command C. Further alternatively, the buzzer configuration command B may be transmitted separately to the print command before the print command is transmitted.

(5) A predetermined command is set as the trigger command in the foregoing embodiment, but predetermined print data may be set as the trigger command. For example, the buzzer 40 could be sounded when a particular character, such as the yen, dollar, or euro sign, is printed at the end of a receipt.

(6) Sounding the buzzer 40 can also be triggered by receiving or executing a predetermined command triggered by receiving or printing predetermined data.

The predetermined data or command is related to outputting a printout from the printer. This command is related to output from the printer, such as a stop printing command, new page command, or paper cutting command, and the buzzer 40 can be sounded when the command is executed to notify the user when the printout was issued. When the printout is a sales receipt, the predetermined data may be set to text that is printed at the end of a receipt, such as an underscore character or specific text such as TOTAL or END, thus enabling notifying the user when the printout is completed.

Specific data or a specific command for causing the buzzer 40 to sound is set in the printer as the default setting. If a command related to issuing a printout, or TOTAL or other predetermined text that is printed at the end of the printout, is predefined and set and stored as the default value, it is also not necessary to send a buzzer configuration command.

The setting may also be cancelled (cleared or reset to the default) based on the printer receiving a print format command. For example, when a daily sales report is printed at the end of each day in a retail store, the setting may be cleared when a command related to the printing format, such as the number of columns, or data such as the date that is printed at the beginning of the report is received so that the buzzer does not sound needlessly. Alternatively, the setting may be reset to the default.

The buzzer 40 sounds at a predetermined time referenced to when predetermined data or a predetermined command is received. A time setting is included in the buzzer configuration command. If it is desirable to inform the user as soon as possible, the buzzer can be configured to sound as soon as the predetermined data or predetermined command is received. If notification when a process actually executes is desirable, the buzzer may be sounded when the predetermined data is printed after the data is received, or when a predetermined command is executed after the command is received.

Considering work done by the user, the buzzer may further alternatively be sounded when a set amount of time has passed after the data is printed or the command is executed. This enables sounding the buzzer when a predetermined time has passed after a receipt is issued so that the buzzer functions as an alarm to help prevent the user from forgetting to take the receipt.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A control method for a printer equipped with a buzzer, comprising:

receiving a print job from a host device that includes a buzzer configuration command and first data or a first command, the buzzer configuration command specifying said first data or first command as a trigger for sounding the buzzer;

storing a buzzer configuration setting including information specifying the first data or first command; and sounding the buzzer based on receipt of the first data or first command each time the first data or first command is received from the host device;

wherein the first data or first command is received from the host device and is related to issuing a printout from the printer; and wherein the buzzer is sounded at a timing specified in the buzzer configuration command, wherein said timing is referenced to when the first data or first command is received.

2. The control method for a printer described in claim 1, wherein: the setting is stored as a default setting in the printer.

3. The control method for a printer described in claim 1, further comprising:

cancelling the setting based on the printer receiving second data or a second command.

4. A control method for a printer equipped with a buzzer, comprising:

receiving a print command stream from a host device that includes a printing control command for printing using the printer, a predetermined command, and a buzzer configuration command for configuring buzzer sounding, the buzzer configuration command specifying the predetermined command as a trigger for buzzer sounding when the predetermined command is received from the host device; and when the predetermined command is contained in the printing control command, causing the buzzer to sound at a predetermined timing specified in the buzzer configuration command and in accordance with a predetermined method specified in the buzzer configuration command when the predetermined command is executed;

wherein the predetermined command is related to issuing a printout from the printer.

5. The control method for a printer described in claim 4, wherein the buzzer configuration command is positioned before the printing control command in the print command stream.

6. The control method for a printer described in claim 5, wherein:

the printing control command includes a new page command specifying a new page process, or a stop printing command specifying a process that is executed after a printing process ends; and the new page command or stop printing command is set as the predetermined command in the buzzer configuration command.

7. The control method for a printer described in claim 6, wherein:

the printing control command contains a plurality of new page commands; and only a portion of the plurality of new page commands is set as the predetermined command in the buzzer configuration command.

8. The control method for a printer described in claim 4, further comprising:

specifying by means of the buzzer configuration command at least one parameter selected from the group consisting of: a buzzer sounding pattern, a buzzer volume, and a buzzer frequency.

9. A printer comprising:

a buzzer;

a communication unit that receives a print job including data and commands sent from a host device;

a storage unit that stores a buzzer configuration setting including information specifying first data or a first command, the first data or first command being specified as a trigger for sounding the buzzer in a buzzer configuration command included in the print job received by the communication unit, wherein the first data or first command is included in the print job; and a control unit that sounds the buzzer based on receipt of the first data or first command from the host device;

wherein the first data or first command is related to issuing a printout from the printer; and wherein the control unit sounds the buzzer at a timing specified in the buzzer configuration command, wherein said timing is referenced to when the first data or first command is received.

* * * * *